(12) United States Patent
Garcia

(10) Patent No.: US 10,139,102 B2
(45) Date of Patent: Nov. 27, 2018

(54) GOLF HOLE ILLUMINATION APPARATUS

(71) Applicant: David Adolfo Garcia, San Diego, CA (US)

(72) Inventor: David Adolfo Garcia, San Diego, CA (US)

(*) Notice: Subject to any disclaimer, the term of this patent is extended or adjusted under 35 U.S.C. 154(b) by 341 days.

(21) Appl. No.: 15/056,934

(22) Filed: Feb. 29, 2016

(65) Prior Publication Data
US 2016/0252243 A1  Sep. 1, 2016

Related U.S. Application Data

(60) Provisional application No. 62/121,825, filed on Feb. 27, 2015.

(51) Int. Cl.
*F21V 33/00* (2006.01)
*A63B 57/40* (2015.01)
*A63B 57/30* (2015.01)
*H04M 1/725* (2006.01)

(52) U.S. Cl.
CPC ............ *F21V 33/008* (2013.01); *A63B 57/40* (2015.10); *A63B 57/357* (2015.10); *A63B 2207/02* (2013.01); *A63B 2225/305* (2013.01); *H04M 1/72533* (2013.01)

(58) Field of Classification Search
CPC ..... F21V 33/008; A63B 57/40; A63B 57/357; A63B 2207/02; A63B 2225/305
USPC .......................................................... 473/176
See application file for complete search history.

(56) References Cited

U.S. PATENT DOCUMENTS

| | | | |
|---|---|---|---|
| 8,465,377 B1* | 6/2013 | Kamnikar | A63B 69/3676 473/266 |
| 2009/0197691 A1* | 8/2009 | Mullen | A63B 57/357 473/176 |
| 2010/0160057 A1* | 6/2010 | Willett | A63B 57/357 473/176 |
| 2013/0314906 A1* | 11/2013 | Spinner | F21V 33/008 362/145 |
| 2014/0185278 A1* | 7/2014 | Burkart | F21V 33/008 362/183 |
| 2017/0030572 A1* | 2/2017 | Spinner | F21V 33/008 |

* cited by examiner

*Primary Examiner* — William N Harris
(74) *Attorney, Agent, or Firm* — Donn K. Harms

(57) ABSTRACT

A golf hole illumination device is provided which when positioned in an as used position in the bottom of a cup descending below the golf hole, will illuminate the golf hole with light emitters. The light emitters can be positioned within the material forming the transparent body which forms a barrier to protect them from moisture and dirt.

16 Claims, 4 Drawing Sheets

GOLF HOLE ILLUMINATION APPARATUS

This application claims priority to U.S. Provisional Application Ser. No. 62/121,825, filed Feb. 27, 2015 which is incorporated in its entirety by this reference thereto.

This invention relates in general to the game of golf. More particularly it relates to a device adapted for positioning within the cup or hole on the green of a golf course which in one preferred mode will illuminate the hole during putting on the green and in another mode can be switched to provide a beacon for shots toward the hole from positions off the green.

BACKGROUND OF THE INVENTION

Field of the Invention

Golf is a sport which is enjoyed by millions of players throughout the world. As is well known, during a game of golf, players employ golf clubs to hit the ball along a golf course in segments of play down fairways which end when the player are able to strike the ball to cause it to land in a hole on an area of a green. The object being to employ the fewest strokes possible with the golf clubs, to place the ball into a respective hole or cup on each green.

As can be discerned, golfers must employ their clubs during each strike upon the ball, to cause the ball to land at a specific spot on the golf course which provides them the best chance to hit the ball into the hole on a green on a subsequent strike of the ball with a golf club. This act of attempting to hit the ball with an appropriate club, to a targeted spot on the golf course, is highly dependant on the ability of the each player to see the targeted spot for the ball they are about to strike.

This need to see the target for the ball being struck, is especially significant when players are on or close to a green on a course, where the hole or cup is located where they wish to land the ball. If players cannot adequately view the hole on the green, especially when they are positioned off the green but in striking distance to place the ball in the hole, this lack of visibility significantly complicates the game.

A lack of clear visibility of the hole on the green, is a significant problem during play at dusk or late in the day. The lack of light from sunshine, and the resulting lack of contrast and the ability to see color by the human eye, makes striking the ball to fall into the hole on the green, extremely difficult. If the player cannot discern where the hole on the green is located, it becomes hard to target the ball to land in the unseen hole. This issue of discerning the hole location is made significantly more difficult when the player is off the green but close enough to strike the ball into the hole on the green. If they cannot see where the hole is at dusk, they cannot strike the ball in a targeted shot to land in the hole.

As such, there exists an unmet need, for a device which will provide players of golf, an enhanced view of the position of a hole on a green, at dusk or late in the day when light from the sun is waning. Such a device should ideally illuminate the location of the hole on the green and be easily viewed when putting on the green, or attempting a shot from a location close to but off the green.

Further, such a device should be positionable in the hole to illuminate it during play and provide a beacon to players off the green, but concurrently when so positioned, not impair the ability of the ball to stay in the hole.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of this invention to provide a device which is employable during the play of golf at dusk or late in the day, which enhances players ability to view the location of a hole on the green during play.

It is a further object of this invention to provide such a hole illumination device, which is positionable in the hole, but so positioned will not affect the ability of the ball to stay in the hole when falling into the hole.

It is a further object of this invention to provide such a device that is employable both as an illumination device for players on or close to the green, and a beacon visible to players well off the green, so they may strike the ball toward the targeted hole with a clear visible understanding of its location.

These and other objects, features, and advantages of the present golf cup illumination invention, as well as the advantages thereof over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

In accordance with the purposes of the present invention, as embodied and broadly described herein, the present invention provides a means to illuminate the cup or hole on a green of a golf course or putting area or the like. The device is formed with a preferably soft body of polymeric material with an exterior circumference sized for positioning within and at the bottom of the hole or cup located on the green of a golf course or on a putting area or the like. So positioned, the device has a plurality of light emitters located around the curved body, which will emit light to illuminate the hole so that the location of the hole on the green may be discerned by players under low light conditions such as at dusk or late in the day.

The body of the device, as noted, is preferably formed of polymeric material which is soft enough that a ball falling into the hole and landing upon the body of the device, will not bounce or otherwise be affected by the presence of the body of the device in the hole. Further, the material forming the body is preferably waterproof or resistant such that in the potentially wet and inhospitable locations where it will be placed, that the internal electrically powered components are not affected by moisture and dirt and the like.

In a preferred mode of the device, the body is formed of substantially transparent material. This transparency allows light emitters such as light bulbs or preferably light emitting diodes (LED's) to transmit generated light, through the body and into the cup and surrounding areas. Thus, the device may be turned on and located within a hole on the green in the bottom of the cup lining the hole, irrespective of water or dirt located therein, and provide illumination of the hole during conditions of play under low light, where the location of the hole is hard or impossible to discern without the light from the device.

In one mode of the device, the light emitters such as LED's are powered by an onboard battery and activated by a switch which connects battery power to the light emitters and causes them to emit light from the body in the bottom of the cup lining the hole on the green. At dusk or in low light playing conditions, the hole on the green will glow and have its perimeter illuminated thereby making the location the hole as a target for a struck ball, clearly visible.

In another mode of the device, which would provide additional utility and is therefor preferred, the body of the device will have a plurality of light emitters engaged around a curved path. Some of this plurality of lights are positioned to emit light to illuminate the perimeter of the hole and cause a viewable glow to the hole from positions on the green or close thereof. Additionally provided are a second set of light emitters on the body, which when energized by connection to the electric power from the battery, will emit a focused beam of light running along a line substantially perpendicular to the plane of the green surrounding the hole and the top surface of the body of the device. This perpendicular beam of light will be discernable in low light conditions from positions well off the green such as positions where a direct viewing of the hole is not possible by a player. For example where the player is in a depression of a sand trap adjacent the green, and cannot directly see the hole.

In the mode of the device with this secondary illumination providing a discernable beam of light upward from the hole, players adjacent the green, or form example on the fairway fifty yards from the green, will be able to discern the location of the hole, in lighting conditions where even viewing the flag extending from the hole is a challenge.

The device can include a simple mechanical or user activated switch to energize either one plurality of light emitters in the mode of the device simply illuminating the hole, or in the mode of the device which provides both hole illumination and a projected beam of light from the hole. Alternatively and preferred for convenience, the device can include a wireless transceiver and microprocessor and electronic switching, to allow users to employ a wireless device such as a remote control, or a smart phone, to activate either hole illumination or a projected beam from the light emitters of the device. In the wireless mode, players many yards from a device positioned within a hole on a green being targeted during play, can activate the light emitters using their smartphone or a remote control, and cause the device to emit a beacon during play from many yards away, and to change to cup illumination when on the green.

With respect to the above description, before explaining at least one preferred embodiment of the herein disclosed golf hole illumination device invention in detail, it is to be understood that the invention is not limited in its application to the details of construction and to the arrangement of the components in the following description or illustrated in the drawings. The device herein described and disclosed in the various modes and combinations is also capable of other embodiments and of being practiced and carried out in various ways which will be obvious to those skilled in the art upon reading this disclosure. Any such alternative configuration as would occur to those skilled in the art is considered within the scope of this patent. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other golf hole illumination devices and for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

The accompanying drawings, which are incorporated herein and form a part of the specification, illustrate some, but not the only nor exclusive examples of embodiments and/or features of the disclosed golf illumination device. It is intended that the embodiments and figures disclosed herein are to be considered illustrative of the invention herein, rather than limiting in any fashion.

DETAILED DESCRIPTION OF THE INVENTION

Figure 1:
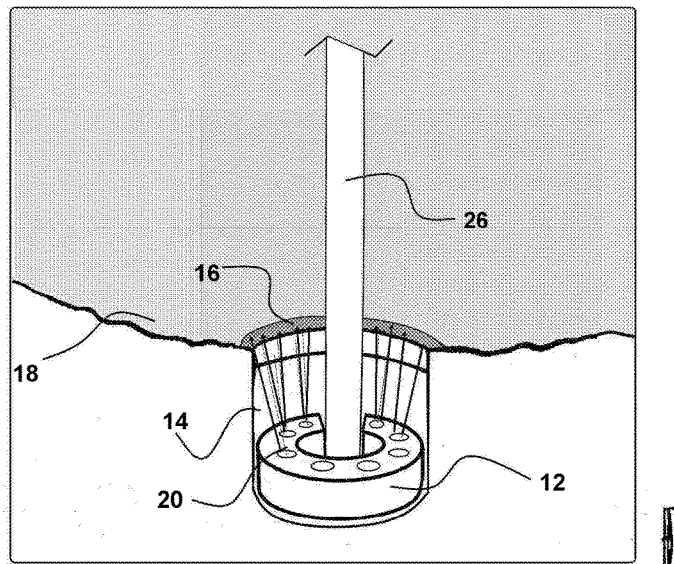
FIG. 1 depicts a perspective view of the golf illumination device in an as-used positioning at a bottom of a cup lining a hole on a golf green or other location.

Now referring to drawings in FIGS. 1-7, wherein similar components are identified by like reference numerals, there is seen in FIG. 1, the golf illumination device 10 in an as-used positioning. The device 10 if formed as a circular or curved body 12 sized with an external circumference which is adapted to easily slide to the bottom of a cup 14 extending into the ground from the hole 16 surrounded by the green 18 or other golf surface.

Figure 3:
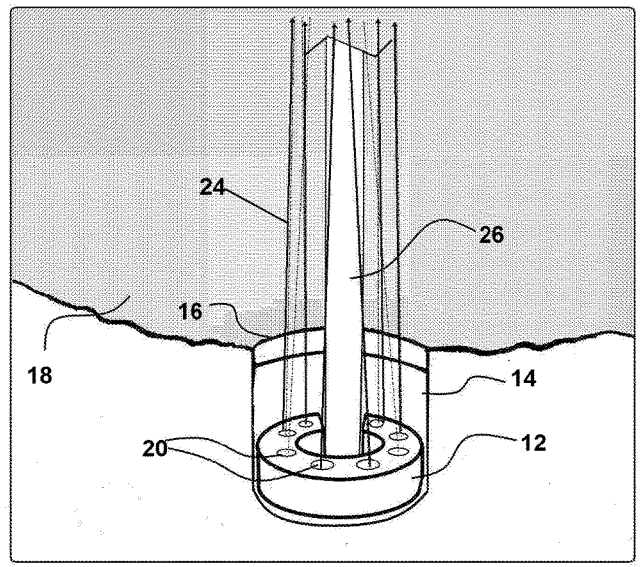
FIG. 3 depicts the golf illumination device having a second mode of illumination wherein a plurality of light emitters emit a focused beam perpendicular to the axis of the hole to form a beacon visible to players who cannot see the hole on the green directly.

The hole 16 defines an aperture opening into the cup 14 into which the body 12 of the device 10 is easily inserted to rest in the as-used position at the bottom of the cup 14 such as in FIGS. 1 and 3. So positioned during as used in all modes of the device 10 herein, the substantially transparent body 12 provides a mount for a plurality of light emitters 12 such as LED's which are engaged within the material of the body 12. The light emitters 12 as depicted in FIG. 1, form a curved or circular pattern of sequentially positioned light emitters 20 which when connected by wires to an electric power source engaged with the body 12 of the device, will illuminate and communicate light through the surrounding transparent material forming the body 12. Of course the light emitters 20 can be engaged to the body 12 such that they are on the top surface of the body 12 and emit light directly, however due to the dirty and wet nature of the positioning of the device 10 during use, positioning the light emitters 20 within the transparent polymeric material forming the body 12, surrounds them and defines a barrier which provides protection from wet and dirty conditions while still allowing the emission or communication of the light emitted from the emitters 20 through and above the body to illuminate the circumference of the hole 16 and areas adjacent it.

Such polymeric material for example is provided by one or a combination of polymeric materials from a group including silicone, polyethylene, polypropylene, polyester, polystyrene, saran, or other polymeric or plastic materials which will yield a body 12 which is substantially transparent and somewhat soft to avoid bouncing of the ball on the body 12. The body 12 should be formed with a diameter equal to or less than 4.2 inches for easy positioning in the cup 14 with a thickness of one half to one inch to maintain the bottom of the cup 14 and not cause the ball to bounce from the hole.

Currently a diameter of the body 12 from outside edge to outside edge, be it round in shape with no gap 32 or across the center running perpendicular to the gap 32 in the body if present is substantially 3.4 to 4 inches as it has been found that this allows for positioning of the light emitters 20 running in a curved line spaced from the edge of the cup sufficiently to achieve an outward and upward angle to either illuminate the edge of the hole and the surrounding grass, or to project the upward beam for viewing from longer distances. The gap 32 is preferably at least 0.5 inches to 1.5 inches to accommodate the varying size of the 26 pole which is not dictated by the rules of golf.

Experimenting shows that a slot width of substantially 0.4 inches to 1.2 inches will accommodate most poles 26 since the material forming the body 14 is pliable and will bend to accommodate a pole 26 larger than 1.2 inches.

Figure 2:
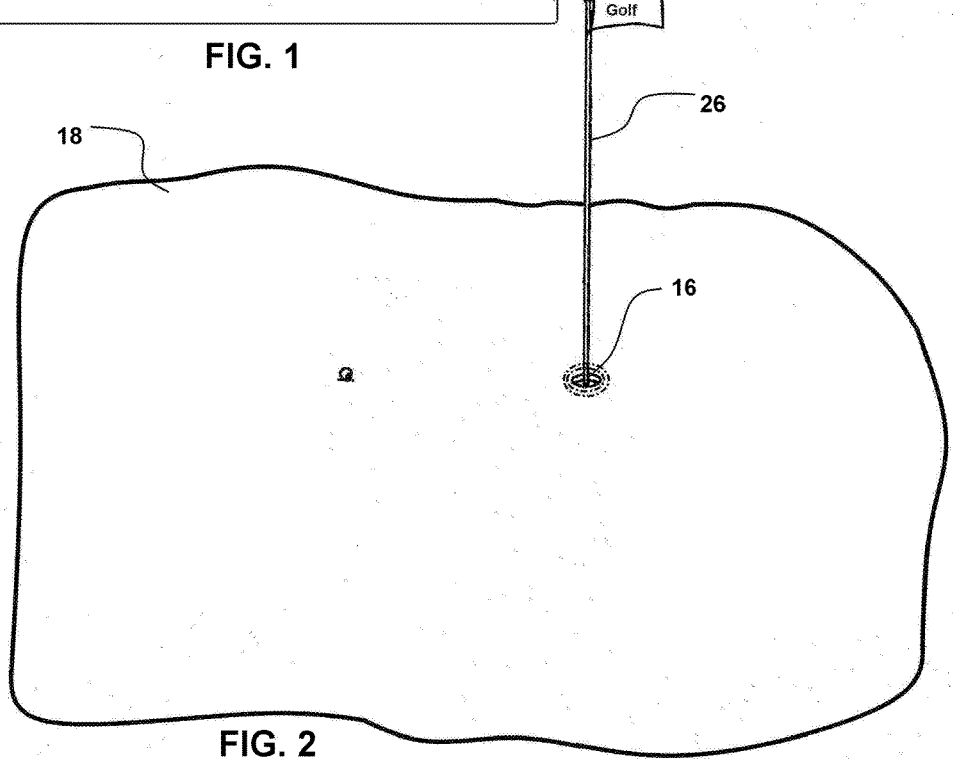
FIG. 2 depicts the glowing illumination of the hole and circumference thereof imparted by the curved row of light emitters of the device of FIG. 1.

In FIG. 2 is seen the glow illumination 20 which emits from the cup 14 to the air situated above and surrounding the hole 16, and provides users a visually discernible target for their hitting of the golf ball during times of inadequate light such as at dusk or early evening when perceiving the hole 16 location is hard or impossible to do.

As can be seen, the light communicated through the body 12 is transmitted into the air above the hole 16 and to the grass or other surface surrounding the circumference of the hole 16, making the hole 16 in the surrounding surface such as a green 18 highly visible as to location. In this mode to illuminate the circumferential edge of the hole 16 and blades of grass rowing adjacent thereto, and air above the hole 16, the light emitters 20 can be aimed to project light at an angle away from the center axis of the cup 14, to impact the area of the cup 14 surrounding the body 12 and the grass or other surface surrounding the hole 16.

Figure 4:
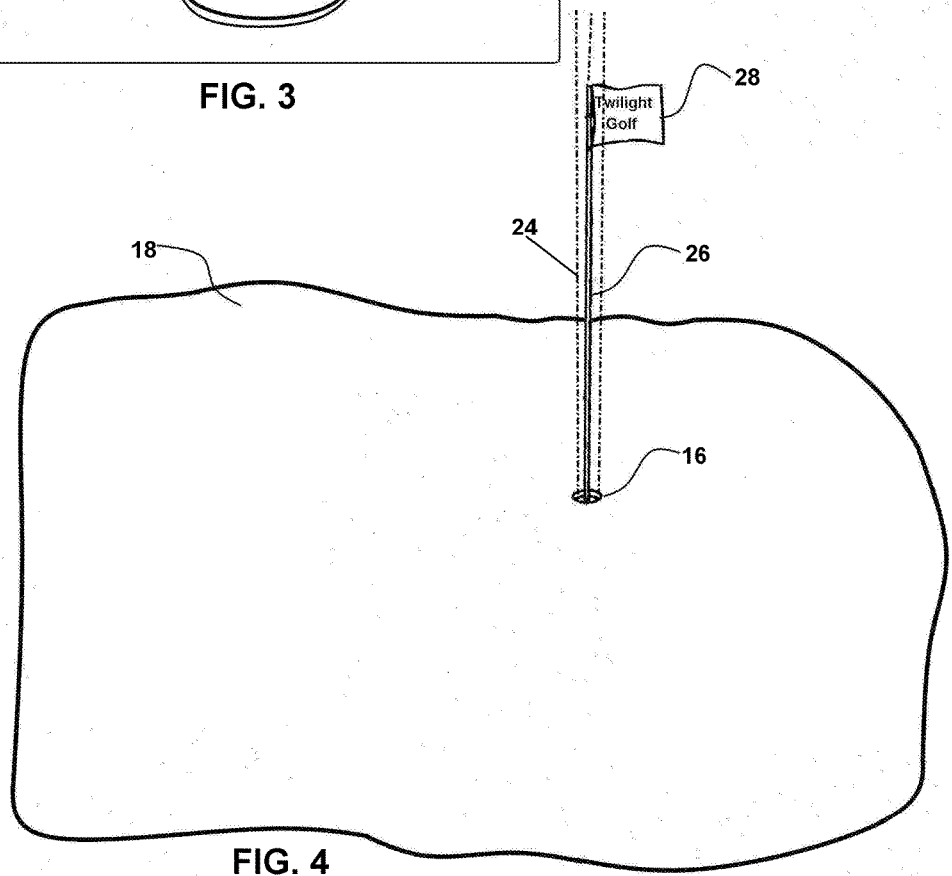
FIG. 4 shows the device as in FIG. 3, with the emitted beam of light extending perpendicular to the axis of the hole and the surface of the green.

In addition to the mode of the device 10 of FIGS. 1-2, the device 10 in another preferred mode, can be configured such as in FIGS. 3-4, with a second illumination configuration wherein a plurality of light emitters 20 are positioned in, or on the top of the body 12 of the device 10 in a configuration which emits a focused beam 24, which exits the hole 16 at an angle aligned or parallel to the center axis of the cup 14 below the hole 16. The light from the emitters 20 in this focused beam, define a beacon visible to players who cannot see the hole on the green directly, and will also illuminate the pole 26 and flag 28 engaged into the cup 14 center, thereby providing both a beacon and easily viewed pole 26 during periods of play in subdued light such as at dusk.

If the device 10 has a manual or electronic switch to toggle between the first illumination mode illuminating the perimeter edge of the hole 16 and air above it, and the second illumination mode emitting a focused beam, the device 10 can include both modes of illumination and a plurality of light emitters 20 to accomplish each illumination mode. Or the device 10 can simple have one mode of illumination and be positioned in a hole 16 as needed for either a beam emitted from the cup, or circumferential illumination, however the dual illumination mode with switching is preferred as one device 10 provides additional utility.

Figure 5:
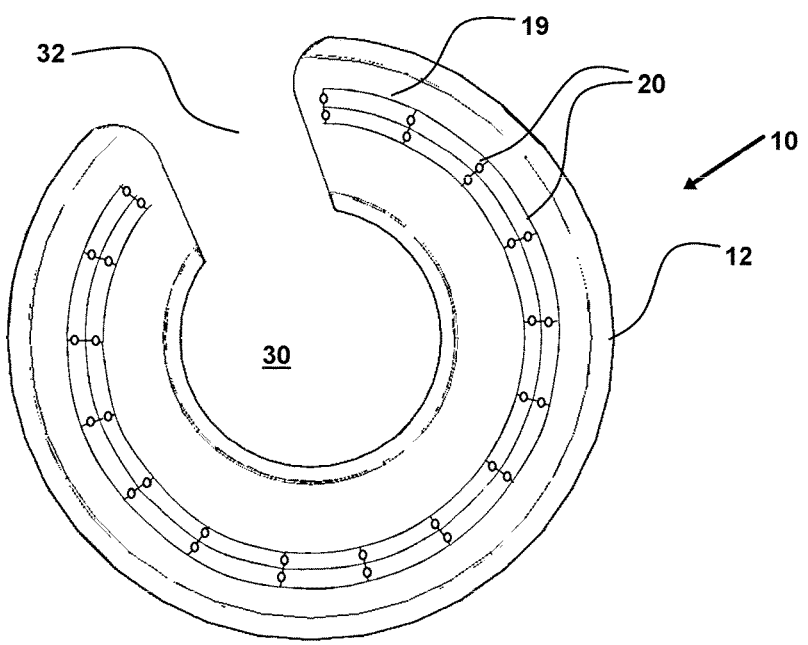
FIG. 5 is an overhead view of a top of the body of the device showing a plurality of light emitters such as LED's arranged in a curved path or pattern and visible therethrough the transparent body.

Shown in FIG. 5, is an overhead view of a top of the body 12 of the device 10 showing a plurality of light emitters 20 such as LED's arranged in parallel curved pattern2, around a central opening 30 which has a slot 32 communicating at a position in the body 12 with the opening 30. As shown, the light emitters 20 could be engaged to a top surface of the body 12, however preferably as depicted herein, they are positioned within the transparent material forming the body 12 which forms a protective layer from the elements, and allow light from the emitters 20 to communicate through the transparent material forming the body 12.

Also, it should be noted that the emitters 20 can be situated and aimed in a third pattern which combines the vertical beam 24 as well as emits an outward upward angled circular pattern to illuminate the edge of the hole 16 such as in FIG. 2 concurrently. However, in experimentation it was found that some golfers might consider the beam 24 distracting when putting, so the mode of the device allowing for a remote control to switch between modes would be more preferable if both illumination schemes are included in the same body 12.

Figure 6:
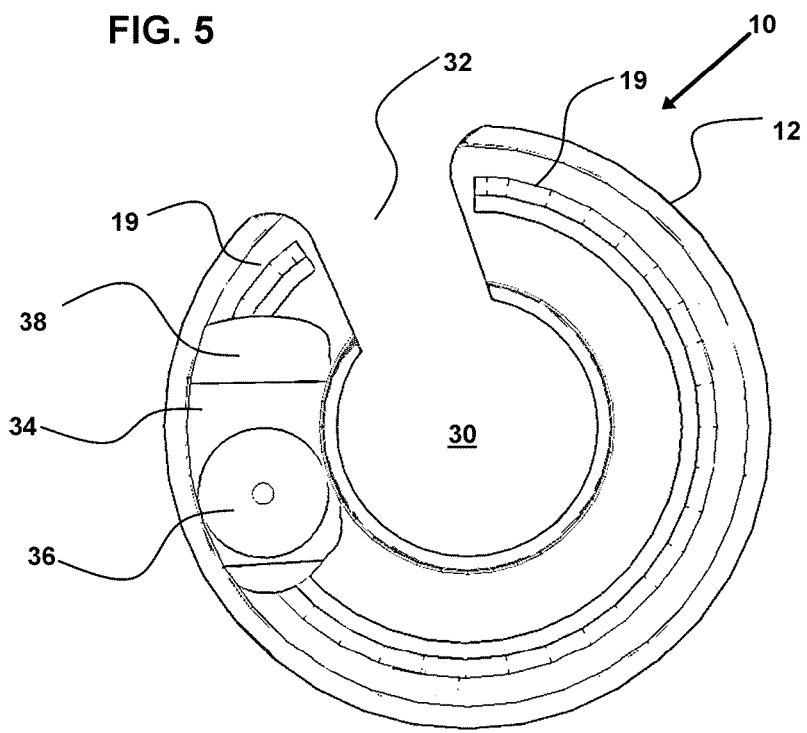
FIG. 6 shows a bottom view of the device of FIG. 4 wherein a battery container providing electric power and a switch and optional wireless control are visible.

While not shown in FIGS. 5-6, the body 12 can be an annular or full circle shape with the same components positioned therein and appear somewhat similar to a donut. Such a mode need not be drawn because those skilled in the art can easily discern the slot 32 would not be present and the opening 30 would be isolated in the middle of the body 12 in this form. As noted herein, it was found that while the donut or circular shape of the body 12 can be employed to light up the circumference or emit a beam of light in the same fashion as the body 12 with the slot 32, it lacks utility provided by the "C" shape with slot 32, as it requires positioning in the cup prior to insertion of the flag pole 26, which is not as convenient to the users as communicating the pole 26 through the slot 32 and into the center opening 30 and simply dropping the body 12 into the cut and removing it therefrom without having to reposition the flag pole 26. However, if permanently installed in the bottom of the cup, an annular or donut shaped body 12 can be used.

An opposite view overhead the bottom of side of the body 12 is shown in FIG. 6. As can be seen through the transparent material forming the body 12, onboard power storage for the emitters 20 is provided by a battery 34 which in operative engagement with a switch 36 which is actuated to connect the electric power to the light emitters 20 an cause them to illuminate.

The switch 36 as noted may be manual and allow actuation for one or both light emitting modes, or the switch 36 can be electronically actuated using a signal received by a wireless receiver 38 which will allow the device 10 to be switched on or off and to one or both modes of light emission using a wireless transmitter device, such as a smartphone (not shown but well known) running software adapted to communicate switching signals to the switch 36 through the receiver 38. In the remote controlled mode, the switch 36 can be actuated to change the lighting scheme between the vertical beam 24 of FIGS. 2-3 or the edge illumination of the perimeter of the hole 16 and the grass or turf adjacent the circumference of the hole 16 as in FIGS. 1-2. In this switching mode users could activate the switch 36 to turn the emitters 20 on or change their lighting scheme from a distance such that they may switch between the beam or perimeter illumination or in a third choice as noted, have both at once.

Figure 7:
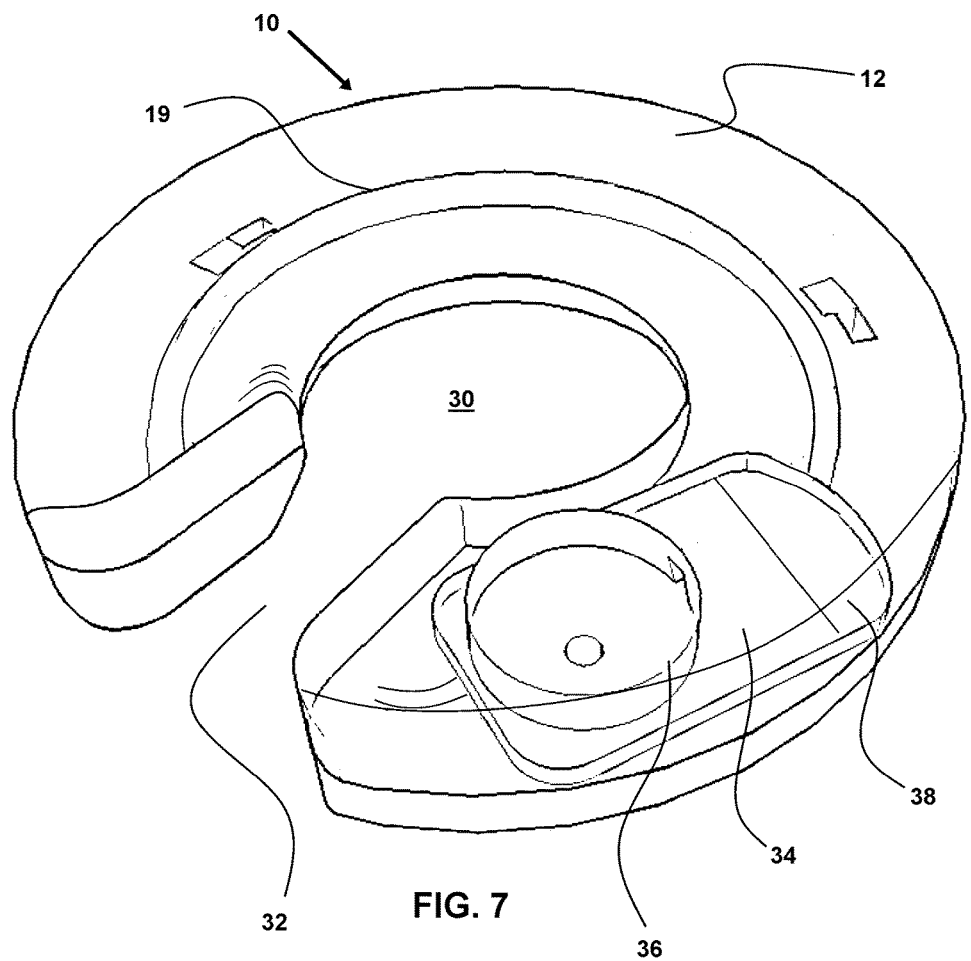
FIG. 7 shows a perspective view of a bottom of the body of the device herein such as in FIG. 5 which depicts the transparent body and internal components of the device.

Finally, as seen in FIG. 7 which shows a perspective view of the body 12 of the device 10 from above the bottom of the body 12, some of the components of the device 10 are viewable through the transparent material forming the body 12. As can be seen, the body 12 has a "C" shape or circular horseshoe shape with the slot 32 communicating with an opening 30 in the middle. While a donut shaped body 12 worked in experimentation and development, it was found such did not accommodate the insertion of the pole 26 into the cup 14 as well as the provision of a slot 32. This slot 32 was found to be preferred as it accommodates the pole 26 of the flag 28 which is generally engaged with a cup 14 below the hole 16 and allows the device 10 to be dropped into the cup 14 without removing the pole 26, and to have the pole 26 inserted without contacting the surface of the body 12 which can damage the internal components. However, donut shape could also be employed which would have to remain in the cup 14 when the flag is inserted which would have to be removed before the circular donut shaped body were removed.

There is also shown in this view, the switch 36 and battery 34 and wireless transceiver 38 which are viewable through the transparent polymeric material of the body 12, as are wiring 19 which communicates power to the light emitters 20 when the switch 36 is actuated manually or electronically to do so.

As noted, any of the different configurations and components can be employed with any other configuration or component shown and described in the golf illumination device herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A golf hole illumination apparatus, comprising:
    an annular body having an opening communicating through a center portion thereof;
    a plurality of sequentially positioned light emitters engaged to said body in a curved path;
    said body having a diameter running between opposing points of a circumferential edge, said diameter adapted for positioning to an as used position, at a bottom of a cup descending from a golf hole;
    a slot communicating through said body from said circumferential edge to said opening,
    said slot forming a passage adapted for a pole extending from a center area of said golf hole to pass into said opening;
    an electric power source providing electricity to said light emitters through wires communicating between said electric power source and said light emitters; and
    said light emitters communicating illumination in a direction toward a circumferential edge of said hole with said body in said as used position, wherein said hole is illuminated by said light emitters.

2. A golf hole illumination apparatus, comprising:
    an annular body formed of transparent material and having an opening communicating through a center portion thereof;
    a plurality of sequentially positioned light emitters engaged within said transparent material of said body in a curved path;
    said body having a diameter running between opposing points of a circumferential edge, said diameter adapted for positioning to an as used position, at a bottom of a cup descending from a golf hole;
    a slot communicating through said body from said circumferential edge to said opening;
    said slot forming a passage adapted for a pole extending from a center area of said golf hole to pass into said opening;
    an electric power source providing electricity to said light emitters through wires communicating between said electric power source and said light emitters; and
    said light emitters communicating illumination through said transparent material in a direction toward a circumferential edge of said hole with said body in said as used position, wherein said transparent material forming said body surrounding said light emitters defines a barrier preventing moisture and dirt from contacting said light emitters and said hole is illuminated by said light emitters.

3. The golf hole illumination apparatus of claim 1, wherein said diameter of said body is between 3.4 to 4 inches.

4. The golf hole illumination apparatus of claim 2, wherein said diameter of said body is between 3.4 to 4 inches.

5. The golf hole illumination apparatus of claim 3, wherein said diameter of said body is between 0.5 to 1.5 inches.

6. The golf hole illumination apparatus of claim 4, wherein said diameter of said body is between 0.5 to 1.5 inches.

7. The golf hole illumination apparatus of claim 1, wherein said illumination from said light emitters communicates in a first lighting scheme at an inclining angle from said body toward said circumferential edge of said golf hole.

8. The golf hole illumination apparatus of claim 1, wherein said illumination from said light emitters communicates in a second lighting scheme in a beam running parallel to said pole extending from said golf hole.

9. The golf hole illumination apparatus of claim 2, wherein said illumination from said light emitters communicates in a first lighting scheme at an inclining angle from said body toward said circumferential edge of said golf hole.

10. The golf hole illumination apparatus of claim 2, wherein said illumination from said light emitters communicates in a second lighting scheme in a beam running parallel to said pole extending from said golf hole.

11. The golf hole illumination apparatus of claim 7, wherein said illumination from said light emitters also communicates in a second lighting scheme, in a beam running parallel to said pole extending from said golf hole; and a switch for actuating between said first lighting scheme and said second lighting scheme.

12. The golf hole illumination apparatus of claim 9, wherein said illumination from said light emitters also communicates in a second lighting scheme, in a beam running parallel to said pole extending from said golf hole; and a switch for actuating between said first lighting scheme and said second lighting scheme.

13. The golf hole illumination apparatus of claim 11 wherein said switch is actuable to switch between said first lighting scheme and said second lighting scheme, by a remote control.

14. The golf hole illumination apparatus of claim 12 wherein said switch is actuable to switch between said first lighting scheme and said second lighting scheme, by a remote control.

15. The golf hole illumination apparatus of claim 13 wherein said remote control is a smartphone.

16. The golf hole illumination apparatus of claim 14 wherein said remote control is a smartphone.

\* \* \* \* \*